US008762061B2

(12) United States Patent
Yee

(10) Patent No.: US 8,762,061 B2
(45) Date of Patent: Jun. 24, 2014

(54) PROCESS FOR GENERATING SPATIALLY CONTINUOUS WIND PROFILES FROM WIND PROFILER MEASUREMENTS

(76) Inventor: Young Paul Yee, Las Cruces, NM (US)

(*) Notice: Subject to any disclaimer, the term of this patent is extended or adjusted under 35 U.S.C. 154(b) by 921 days.

(21) Appl. No.: 12/837,909

(22) Filed: Jul. 16, 2010

(65) Prior Publication Data
US 2011/0172920 A1 Jul. 14, 2011

Related U.S. Application Data

(63) Continuation of application No. 12/538,557, filed on Aug. 10, 2009, now abandoned, which is a continuation of application No. 11/653,415, filed on Jan. 12, 2007, now abandoned.

(51) Int. Cl.
G01W 1/00 (2006.01)
G01S 13/95 (2006.01)
G01S 7/41 (2006.01)
G01W 1/02 (2006.01)
G01S 13/50 (2006.01)

(52) U.S. Cl.
CPC .............. G01S 7/417 (2013.01); G01W 1/02 (2013.01); G01S 13/951 (2013.01); G01S 13/50 (2013.01)
USPC ................ 702/3; 342/26 R; 702/143; 706/2

(58) Field of Classification Search
CPC ........... G01S 7/417; G01S 7/003; G01S 7/06; G01S 13/951; G01S 13/953; G01S 13/50; G01S 13/87; G01W 1/01; G01W 1/02; G01W 1/10
USPC ............... 702/1–4, 127, 142, 143; 73/170.11, 73/170.13, 170.16, 170.28, 178 R; 342/26 D, 26 R, 52–54, 59, 175, 342/192–197; 374/161; 706/2
See application file for complete search history.

(56) References Cited

U.S. PATENT DOCUMENTS

| 5,648,782 | A | 7/1997 | Albo et al. ...................... 342/26 |
| 6,061,672 | A | 5/2000 | Caponetto et al. ................ 706/2 |
| 6,067,852 | A | 5/2000 | Alber et al. .................. 73/178 R |
| 6,405,134 | B1 | 6/2002 | Smith et al. ...................... 702/4 |
| 6,536,948 | B1 | 3/2003 | Vivekanandan et al. ....... 374/161 |
| 6,563,452 | B1 | 5/2003 | Zheng et al. .................... 342/26 |
| 6,581,008 | B2 | 6/2003 | Intriligator et al. .............. 702/3 |
| 6,816,786 | B2 | 11/2004 | Intriligator et al. .............. 702/3 |

Primary Examiner — John H Le
(74) Attorney, Agent, or Firm — Luis M. Ortiz; Kermit D. Lopez; Ortiz & Lopez, PLLC

(57) ABSTRACT

A neural network process for improving wind retrievals from wind profiler measurements is described. In this invention, a neural network is trained to retrieve (missing or incomplete) upper level winds from ground based wind profiler measurements. Radiosonde measurements in conjunction with wind profiler ground measurements for specific geographical locations are used as training sets for the neural network. The idea is to retrieve timely and spatially continuous upper level wind information from (fragmented or incomplete) wind profiler measurements.

10 Claims, 5 Drawing Sheets

PROCESS FOR GENERATING SPATIALLY CONTINUOUS WIND PROFILES FROM WIND PROFILER MEASUREMENTS

APPLICATION PRIORITY

The present application is a continuation of U.S. patent application Ser. No. 12/538,557, entitled "Process for generating spatially continuous wind profiles from wind profiler measurements," filed Aug. 10, 2009 now abandoned, which is a continuation of U.S. patent application Ser. No. 11/653,415, entitled "Process for generating spatially continuous wind profiles from wind profiler measurements," filed Jan. 12, 2007 now abandoned, which are both hereby incorporated by reference.

TECHNICAL FIELD

The present invention relates to improving retrievals of vertical profiles of horizontal winds from wind profiler systems. In particular, the objectives are (a) to extend the vertical measurement range of wind profilers, (b) to provide complete, continuous vertical wind profiles [from fragmented wind measurements], and (c) to improve the accuracy of present day wind profiler systems using neural network methodology.

BACKGROUND

Pioneer neural network research was conducted at the former Atmospheric Sciences Laboratory in the early 1990's (Measure & Yee, 1992). The research involved experimentation with neural network methods to retrieve temperature profiles from ground based microwave radiometers (Yee & Measure, 1992) as well as from satellite radiance measurements (Bustamante, et al, 1994). Neural networks were trained using simulated microwave radiometric measurements and archived radiosonde measurements to produce vertical profiles of temperature from the surface to approximately 10 kilometers.

The success of these earlier studies prompted wind vector retrievals using satellite radiances (Cogan, et al, 1997). Those experiments have yielded errors comparable to those achieved by other sounder based methods. Current studies involve the fusion of varied measurement sources to improve the upper level wind retrievals using neural network techniques. Neural networks are ideally suited for processing diverse data measurements and analyzing large data sets.

One of the salient features of wind profilers, in general, is that they can provide continuous time measurements without the extra expenditure of resources that a radiosonde would require. The disadvantages or limitations of wind profilers include limited range during adverse weather conditions, interference from insects and birds, false signals from other sources, and incomplete or missing data coverage.

Wind Profiler Systems

There are several wind profiler systems that are available in the commercial market. The first, is the Sodar (sonic detection and ranging) system. Sodar systems are used to remotely measure the vertical turbulence structure and the wind profile of the lower layer of the atmosphere. Sodar systems are like radar (radio detection and ranging) systems except that sound waves rather than radio waves are used for detection. Other names used for sodar systems include sounder, echo sounder and acoustic radar. A more familiar related term may be sonar, which stands for sound navigation ranging. Sonar systems detect the presence and location of objects submerged in water (e.g., submarines) by means of sonic waves reflected back to the source. Sodar systems are similar except the medium is air instead of water and reflection is due to the scattering of sound by atmospheric turbulence.

Most sodar systems operate by issuing an acoustic pulse and then listening for the return signal for a short period of time. Generally, both the intensity and the Doppler (frequency) shift of the return signal are analyzed to determine the wind speed, wind direction and turbulent character of the atmosphere. A profile of the atmosphere as a function of height can be obtained by analyzing the return signal at a series of times following the transmission of each pulse. The return signal recorded at any particular delay time provides atmospheric data for a height that can be calculated based on the speed of sound. Sodar systems typically have maximum ranges varying from a few hundred meters up to several hundred meters or higher. Maximum range is typically achieved at locations that have low ambient noise and moderate to high relative humidity. At desert locations, sodar systems tend to have reduced altitude performance because sound attenuates more rapidly in dry air.

Another type of wind profiler system is the Radar (radio detection and ranging) system. The Radar systems are similar in principle to sodars except that radio frequencies are transmitted instead of sound waves. These systems tend to have longer ranges than the sodars but can be very large physically and not as mobile.

Yet another type of wind profiler system is the Lidar (light detection and ranging) system. The Lidar systems use Doppler frequency shifts in the light region of the electromagnetic spectrum. Typically, visible and infrared wavelengths of light are employed in these systems. One disadvantage in these systems is that infrared radiation can be absorbed under wet atmospheric conditions.

Some of the advantages of wind profiler systems are obvious compared to erecting tall towers with in-situ wind and temperature sensors. First, a wind profiler system can generally be installed in a small fraction of the time it takes to erect a tall tower except for large radar antenna systems. Sodar systems do have some drawbacks compared to tall towers fitted with in-situ wind sensors. One of the most significant is the fact that sodar systems generally do not report valid data during periods of heavy precipitation.

All the wind profilers have certain limitations and atmospheric conditions play a very important role in the retrieval of reliable wind vectors. In many cases, it is difficult to obtain consistent winds at the maximum detectable heights of these remote sensors. A neural network has been developed to estimate upper level winds from these ground based wind profilers to extend their capabilities at a particular locale.

Radiosondes

While various efforts were attempted at remotely sensing the atmosphere with instruments onboard unmanned free balloons, the current type of radiosonde dates back to January 1930, when Pavel A. Molchanov, a Russian meteorologist, made a successful radio sounding into the stratosphere. He launched his radiosonde at Pavlovsk. His goal was a cheap, and expendable means of sounding the atmosphere for temperature, moisture and wind data.

Radiosondes were first used by the U.S. Weather Bureau in 1936. During that year a radiosonde network of several stations was inaugurated to obtain upper air soundings on a routine basis. This network replaced the kite and aircraft sounding programs. Currently, 70 radiosonde stations are distributed across the continental United States. Radiosondes are launched from these stations twice daily, just prior to 0000 and 1200 universal time. Radiosondes can be launched in almost any type of weather. While the radiosonde is reasonably durable, severe thunderstorms and heavy precipitation may cause instrument failure or radio interference.

Weather balloons measure the upper air at heights from near the ground up to 30 km. Weather balloons carry instrument packages called radiosondes high into the atmosphere that gather essential upper-air data needed to forecast the weather. These instruments are launched twice a day at 1,100 sites around the world. Temperature, humidity and air pressure are measured at various altitudes and transmitted via radio waves to a receiving station. Radio navigation supplies wind speed and direction at each altitude.

The biggest disadvantages of radiosondes are expense and timeliness, the lack of continuous measurements. Typically, radiosondes are launched twice a day: one in the morning and one in the evening. This does not cover the whole day in which significant weather events can occur. In terms of expense, once a weather balloon is launched, the balloon, the meteorological sensors, and the helium used to inflate the balloon are lost.

What are needed are methods and systems to obtain near continuous, real-time wind measurement data.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

Accurate real-time upper level wind measurements can provide essential input into operational mesoscale models for their initialization and verification. Although there are a number of ground based wind profilers available (wind tracer lidar, doppler radar, and acoustical sounders), measuring upper level winds and obtaining a complete continuous vertical wind profile can be problematic and is highly dependent on favorable atmospheric conditions. In this invention, we use a neural network to retrieve upper level winds and to provide a continuous wind profile from ground based wind profilers. Radiosonde measurements in conjunction with wind profiler ground measurements for a geographical location are used as training sets for the neural network. The idea is to retrieve timely and continuous upper level wind information from incomplete or limited range wind profiler measurements.
Applications Accurate and complete wind profiles are important for numerous applications. Some of these applications are listed as follows:
  a. Atmospheric boundary layer research
  b. Air traffic warnings
  c. Turbulence hazards
  d. Input data to meteorological weather prediction models
  e. Hazard waste transport and diffusion
  f. Military operations and maneuvers
  g. Wind energy analysis
  h. Emergency response wind monitoring
  i. Aircraft safety
  j. Communications
  k. Severe weather tracking
Neural Network Architecture Training the neural network would involve the collection of coincident wind profiler data and radiosonde wind data for a geographical site. These data would be filtered via algorithms that screen the data for missing fields and defective data records. If pertinent data is missing in any of the training set's data fields, that individual test case, i.e. wind profile, will be rejected for the purpose of training or testing. After extracting the wind direction and wind speed for selected height levels of interest, the wind parameters will be converted to U components (East-West) and corresponding V components (North-South) of the wind.

The algorithms discussed herein are not inherently related to any particular computer or other apparatus. Various general-purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

The specific systems and methods herein are merely illustrative of the principles of this invention. Numerous modifications in form and detail may be made by those skilled in the art without departing from the true spirit and scope of the invention.

DETAILED DESCRIPTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore not to be taking in a limiting sense, and the scope of the present invention is defined only by the appended claims.

Figure 1:
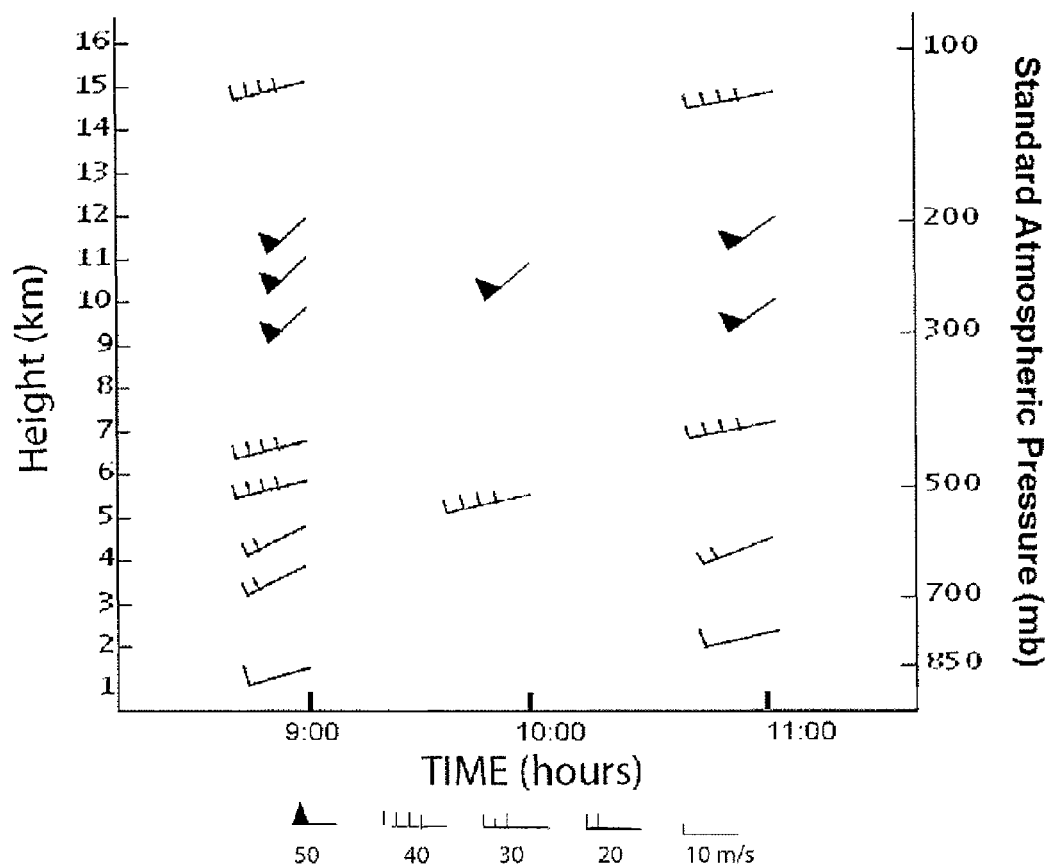
FIG. 1 is a screen capture image of wind profiler measurements showing vertical wind profiles from a NOAA profiler network Doppler radar located in Haskell, Okla.

FIG. 1 is a screen capture image of wind profiler measurements 100 showing [fragmented] vertical wind profiles 110 from a NOAA profiler network Doppler radar located in Haskell, Okla. The image depicts hourly wind profiles from near the surface to 14 km height. This figure shows the absence of wind data 120 associated with the Doppler radar based wind profiler measurements. This is just a representation of various other wind profiler measurements where the data is not fully represented.

Figure 2:
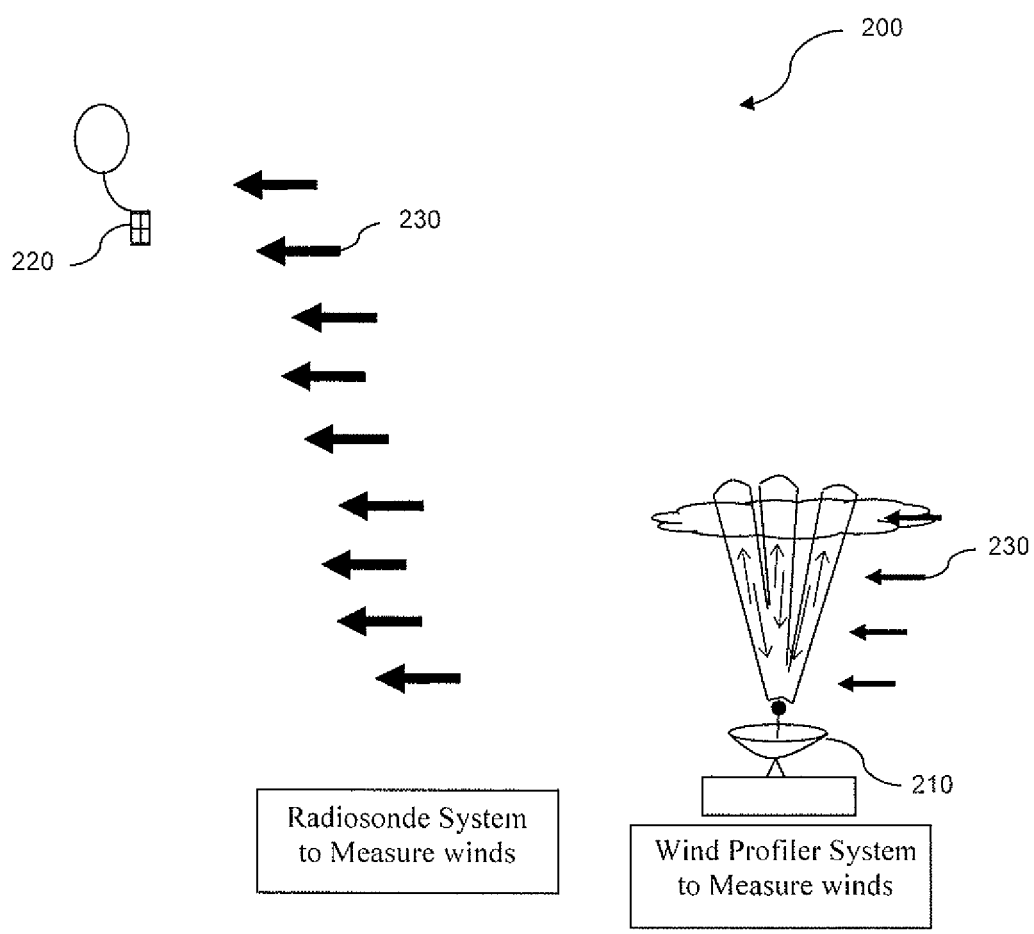
FIG. 2 is a diagram of measurements from a wind profiler system (Doppler lidar, sodar, radar, etc) and from a radiosonde system.

FIG. 2 is a diagram of measurements 200 from a wind profiler system 210 (Doppler lidar, sodar, radar, etc) and from a radiosonde system 220. The wind profiler system 210 measures winds 230 in the lower atmosphere and the radiosonde system 220 measures winds 230 from near the ground to heights as high as 30 km depending on the atmospheric conditions. These near coincident measurements at geographical locations of interest will be used as the training set for the neural network.

Figure 3:
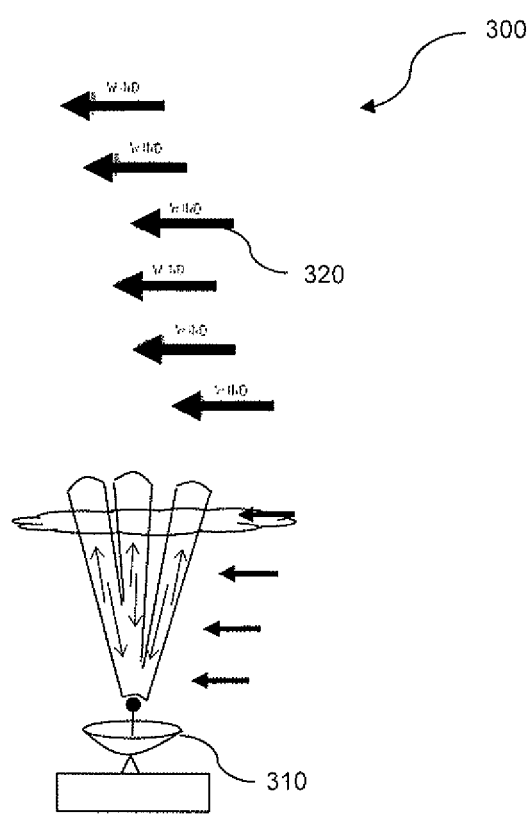
FIG. 3 is a diagram of measurements from a wind profiler system in an operational mode.

FIG. 3 is a diagram of measurements 300 from a wind profiler system 310 in an operational mode. Using the trained neural network from the experimental setup in FIG. 2, the new wind profiler algorithm would be capable of retrieving upper level winds 320, with associated root mean square errors, above the range limitations of the wind profiler instrument.

Figure 4:
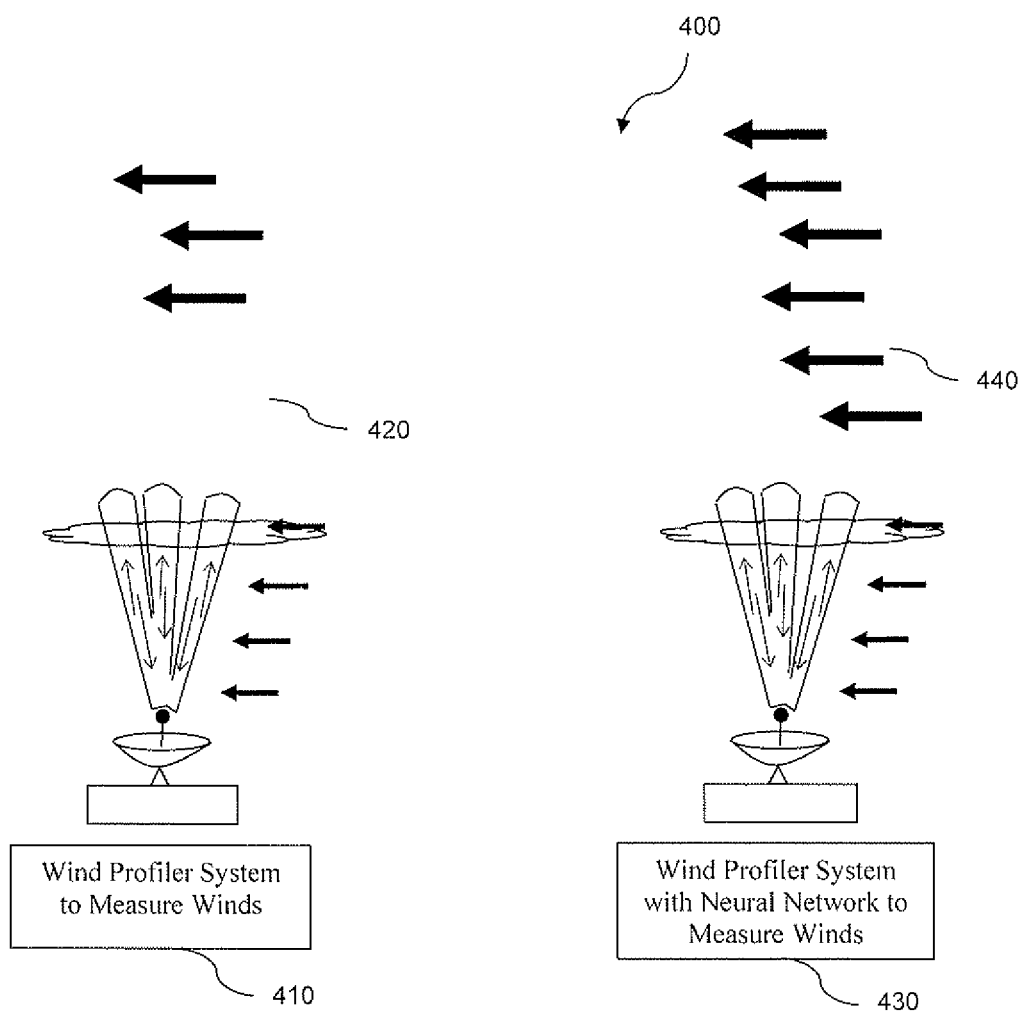
FIG. 4 is a diagram of a wind profiler system that can produce incomplete wind profiles due to signal contamination, signal noise, clutter, and other factors and a diagram and a diagram of a wind profiler system and a neural network that is capable of determining a complete wind profile with associated root mean square errors for a particular location.

FIG. 4 is a diagram of a wind profiler system 400 that is not able to produce wind profiles due to signal contamination, signal noise, clutter, and other factors. In an operational mode, questionable wind vectors are discarded, thereby producing a wind profile 410 with missing wind data 420. Using the wind profiler system with a neural network 430, a complete wind profile 440 can be inferred with associated root mean square errors for a particular location. Complete and continuous wind profiles 440 are required by many weather modeling applications.

Figure 5:
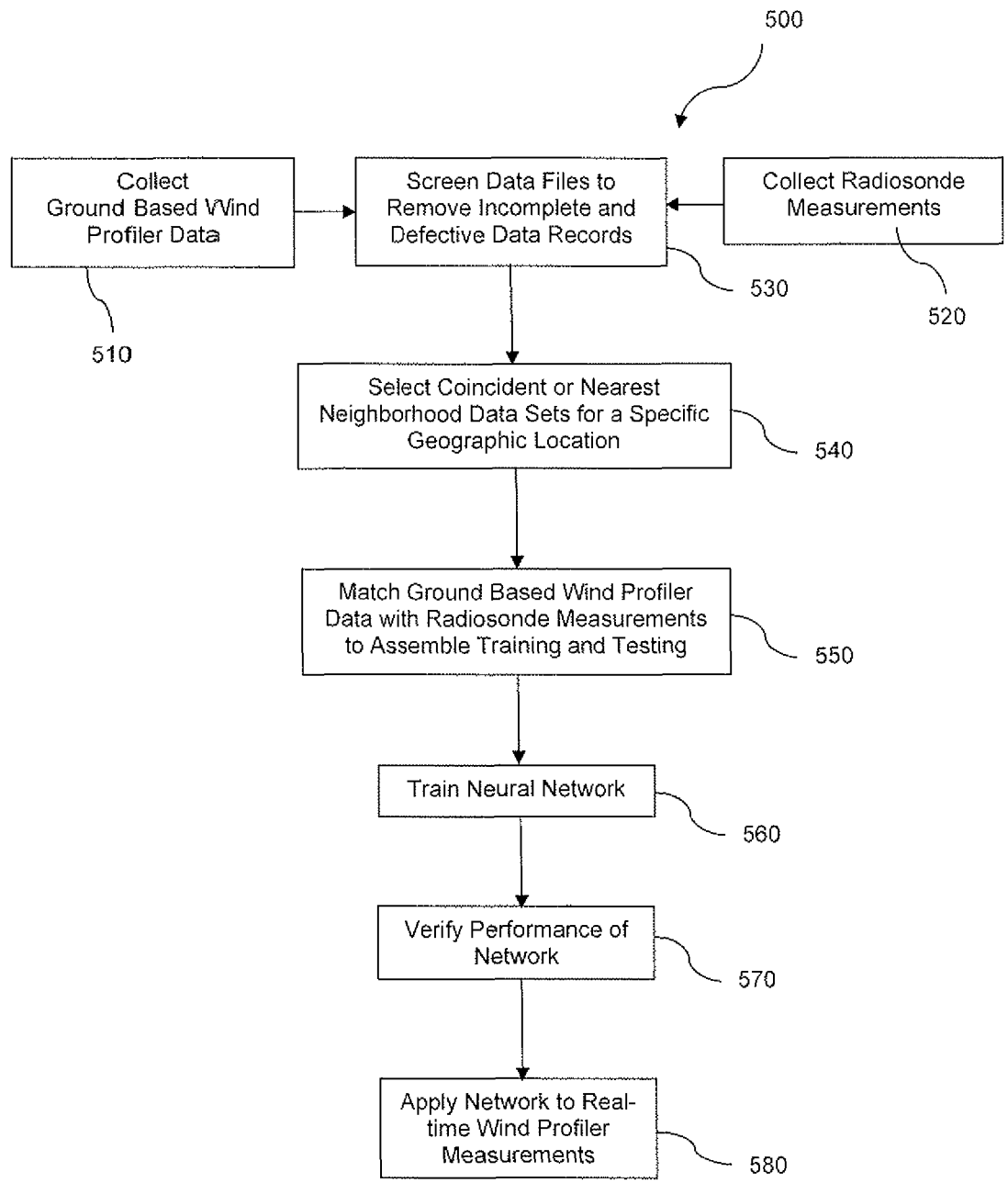
FIG. 5 is a flowchart of one embodiment of a neural network training procedure using near coincident wind profiler and radiosonde measurements.

FIG. 5 is a flowchart of one embodiment of a neural network training procedure using near coincident wind profiler and radiosonde measurements. The performance of the trained neural network would be evaluated using test cases not used in the original training set. First, the ground based wind profiler data is collected 510 as well as the radiosonde measurements 520. Then, the data files are screened to remove incomplete and defective data records 530. Afterwards, coincident or nearest neighborhood data sets for a specific geographical location is selected 540. The ground based wind profiler data is matched with the radiosonde measurements to assemble training and testing sets 550. Then, the neural network is trained 560. The performance of the network is verified 570. Finally, the network is applied to the real-time wind profiler measurements 580.

Major Components of the Wind Profiler Neural Network

The major components of the wind profiler neuron are described by seven major components, which make up the wind profiler neural network. These components are valid whether the neuron is used for input, output, or is in one of the hidden layers.

Component 1. Weighting Factors: The wind profiler neuron will receive many simultaneous inputs, primarily wind measurements at various atmospheric heights. Other inputs may include synoptic conditions and other meteorological parameters of interest. Each meteorological input will have its own relative weight, which gives the input the impact that it needs on the processing element's summation function. The neural response from the combined inputs will be an inferred wind vector at an atmospheric height where measured winds are missing.

Component 2. Summation Function: The first step in a wind profiler processing element's operation is to compute the weighted sum of all of the inputs. Mathematically, the meteorological inputs and the corresponding weights are vectors which can be represented as (i1, i2 ... in) and (w1, w2 ... wn). The total input signal is the dot, or inner, product of these two vectors. This simplistic summation function is found by multiplying each component of the i vector by the corresponding component of the w vector and then adding up all the products. Input1=i1*w1, input2=i2*w2, etc., are added as input1+input2+ ... +inputn. The result is a single wind value, not a multi-element vector. The summation function can be more complex than just the simple meteorological input and weight sum of products. The input and weighting coefficients can be combined in many different ways before passing on to the transfer function. In addition to a simple product summing, the summation function can select the minimum, maximum, majority, product, or several normalizing algorithms.

Component 3. Transfer Function: The result of the summation function is transformed to a working output through an algorithmic process known as the transfer function. In the transfer function the summation total can be compared with some threshold to determine the neural output. If the sum is greater than the threshold value, the processing element generates a signal. If the sum of the input and weight products is less than the threshold, no signal (or some inhibitory signal) is generated. Prior to applying the transfer function, uniformly distributed random noise may be added.

Component 4. Scaling and Limiting: After the wind profiler processing element's transfer function, the result can pass through additional processes which scale and limit. This scaling simply multiplies a scale factor times the transfer value, and then adds an offset.

Component 5. Output Function (Competition): Each wind profiler processing element is allowed one output wind value which it may output to other neurons. Neurons are allowed to compete with each other, inhibiting processing elements unless they have great strength. Competition can occur at one or both of two levels. First, competition determines which wind profiler neuron will be active, or provides an output. Second, competitive inputs help determine which processing element will participate in the learning or adaptation process.

Component 6. Error Function and Back-Propagated Value: In the wind profiler learning networks the difference between the current output and the desired output is calculated. This raw error is then transformed by the error function to match a particular network architecture. The artificial neuron's error is then propagated into the learning function of another processing element. The current error is typically propagated backwards to a previous layer.

Component 7. Learning Function: The purpose of the learning function is to modify the variable connection weights on the inputs of each processing element according to wind profiler neural based algorithm.

After neural network processing of the wind profiler training set, the weights would be calculated for each height level. The basic formulation would be as follows for the U and V components of the wind vector of interest:

a. U(level of interest)=b(U)+U(level1)*w1(U)+U(level2)*w2(U)+ ... +U(leveln)*wn(U)
b. V(level of interest)=b(V)+V(level1)*w1(V)+V(level2)*w2(V)+ ... +V(leveln)*wn(V)

where
c. U(level of interest)=U component of the wind at the level of interest i.e. level with the missing winds
d. V(level of interest)=V component of the wind at the level of interest i.e. level with the missing winds
e. b1=bias coefficient for the U component of the wind
f. b2=bias coefficient for the V component of the wind
g. w1(U) ... wn(U)=weighting coefficients for the U component of wind corresponding to measured winds at specific levels
h. w1(V) ... wn(V)=weighting coefficients for the V component of wind corresponding to measured winds at specific levels

DEFINITIONS

Neural Network—A neural network ("neural net") is a collection of nodes and weighted connections between the nodes. The nodes are configured in layers. At each node, all of the inputs into the node are summed, a non-linear function is applied to the sum of the inputs and the result is transmitted to the next layer of the neural network.

Radiosonde—The radiosonde is a balloon-borne instrument platform with radio transmitting capabilities. Originally named a radio-meteorograph, the instrument is now referred to as a radiosonde, a name apparently derived by H. Hergesell from a combination of the words "radio" for the onboard radio transmitter and "sonde", which is messenger from old English. The radiosonde contains instruments capable of making direct in-situ measurements of air temperature, humidity and pressure with height, typically to altitudes of approximately 30 km. These observed data are transmitted immediately to the ground station by a radio transmitter located within the instrument package. The ascent of a radiosonde provides an indirect measure of the wind speed and direction at various levels throughout the troposphere. Ground based radio direction finding antenna equipment track the motion of the radiosonde during its ascent through the air. The recorded elevation and azimuth information are converted to wind speed and direction at various levels by triangulation techniques. Modern day radiosondes have GPS tracking systems.

Rawinsonde—A rawinsonde (or radio wind sonde) is a radiosonde package with an attached radar reflector that permits radio-direction finding equipment to determine the wind direction and wind speed at various altitudes during the ascent of the package.

Wind Profiler System—In this document, a wind profiler system will refer to any embodiments of apparatus that measure winds remotely, specifically, this includes Doppler radar, Doppler lidar, sodar, etc.

A neural network process for improving wind retrievals from wind profiler measurements is described. In this invention, a neural network is trained to retrieve [missing or incomplete] upper level winds from ground based wind profilers. Radiosonde measurements in conjunction with wind profiler ground measurements for specific geographical locations are used as training sets for the neural network. The idea is to retrieve timely and spatially continuous upper level wind information from [fragmented or incomplete] wind profiler measurements. The neural network wind profiler process will generate reasonable estimated wind profiles that can be applicable to many types of weather and meteorological models, synoptic and global.

It is contemplated that the use of the present invention can involve components having different characteristics. It is intended that the scope of the present invention be defined by the claims appended hereto, giving full cognizance to equivalents in all respects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A spatially continuous vertical wind profile system, comprising:
a wind profile data collector for transmitting and receiving a plurality of wind profile data;
a radiosonde measurements collector for collecting a plurality of radiosonde measurements of winds;
a processor for determining a plurality of weighted input data from said plurality of wind profile data and said radiosonde measurements for analysis by a neural network;
a data screener for removing incomplete and erroneous data;
a selector for selecting a coincident neighborhood data set for a plurality of geographical locations;
an assembler for assembling a coincident neighborhood data sets;
a trainer for training said neural network for said plurality of geographical locations;
a coefficient computation element for computing a plurality of weighting coefficients correlating to wind at a plurality of atmospheric height levels of interest where measured winds are missing;
an error computation element for computing a plurality of root mean square (RMS) errors using a plurality of archived wind profiler measurements obtained by said radiosonde measurements collector; and
a storage element for archiving said plurality of weighting coefficients and said plurality of RMS errors;
wherein said neural network analyzes a plurality of operational wind profiler measurements derived by elements of the system to provide a plurality of spatially continuous vertical wind profiles.

2. The system of claim 1, wherein said wind profile data comprises at least one of a radar, a sodar, and lidar signals.

3. The system of claim 1, wherein said radiosonde measurements comprise at least one of synoptic weather conditions, temperature, pressure, height and moisture.

4. The system of claim 1, wherein said neural network comprise a plurality of nodes and a plurality of weighted connections between said plurality of nodes.

5. The system of claim 4, wherein said plurality of nodes are configured in layers such that at each node, all of the inputs into the node are summed, a non-linear function is applied to the sum of the inputs and the result is transmitted to the next layer of the neural network.

6. A neural network wind profiler method comprising:
collecting a ground based wind profile data from a database;
using a radiosonde for collecting a radiosonde measurements;
providing a processor including neural network programming for:
screening data files to remove incomplete and defective data;
selecting a coincident data sets for a specific geographical location;
matching said ground based wind profile data with said radiosonde measurements to assemble training and testing sets;
training a neural network to analyze upper level winds from ground based wind profilers to generate reasonable estimated wind profiles applicable to plural weather and meteorological models;
verifying the performance of said neural network; and
applying said neural network to a real-time wind profiler measurement to analyze a plurality of operational wind profiler measurements derived by elements of the system and provide a plurality of spatially continuous vertical wind profiles.

7. The system of claim 6, wherein said wind profile data comprises at least one of a radar, a sodar, and lidar signals.

8. The system of claim 6, wherein said radiosonde measurements comprise at least one of synoptic weather conditions, temperature, pressure, height and moisture.

9. The system of claim 6, wherein said neural network comprise a plurality of nodes and a plurality of weighted connections between said plurality of nodes.

10. The system of claim 9, wherein said plurality of nodes are configured in layers such that at each node, all of the inputs into the node are summed, a non-linear function is applied to the sum of the inputs and the result is transmitted to the next layer of the neural network.

* * * * *